United States Patent [19]

Foley

[11] Patent Number: 4,693,914
[45] Date of Patent: Sep. 15, 1987

[54] CURING OF PRECERAMIC ARTICLES WITH GASEOUS THIONYL CHLORIDE

[75] Inventor: Paul Foley, Oldwick, N.J.

[73] Assignee: Celanese Corporation, New York, N.Y.

[21] Appl. No.: 859,952

[22] Filed: May 5, 1986

[51] Int. Cl.$^4$ .............................................. C23C 16/00
[52] U.S. Cl. ................................ 427/255; 427/255.1; 427/255.4; 427/399
[58] Field of Search .................. 427/255.1, 248.1, 255, 427/255.6, 255.4, 399, 400, 322, 444, 226, 372.2, 377; 501/88; 528/25; 8/115.54, 115.56

[56] References Cited

U.S. PATENT DOCUMENTS 3,549,307 12/1970 Hirsch .............................. 427/255.4
3,929,851 12/1975 Atherton et al. .................... 556/454
4,535,007 8/1985 Cannady .............................. 427/226

FOREIGN PATENT DOCUMENTS 57-96836 6/1982 Japan ................................ 427/255.4

Primary Examiner—Sadie L. Childs
Attorney, Agent, or Firm—Depaoli & O'Brien

[57] ABSTRACT

A novel curing process for preceramic organosilicon polymers is disclosed which involves contact with a gaseous thionyl chloride.

4 Claims, 1 Drawing Figure

CURING OF PRECERAMIC ARTICLES WITH GASEOUS THIONYL CHLORIDE

RIGHTS OF THE GOVERNMENT

This invention was made with Government support under a subcontract with Dow Corning under Prime Contract No. F33615-83-C-5006 awarded by the Department of Defense (DOD). The Government has certain rights in this invention.

FIELD OF THE INVENTION

This invention relates to the production of preceramic and ceramic-shaped articles from organosilicon polymers.

BACKGROUND OF THE INVENTION

Ceramic materials are of critical importance for a number of high temperature, high performance applications such as gas turbines. These applications require a unique combination of properties such as high specific strength, high temperature mechanical property retention, low thermal and electrical conductivity, hardness and wear resistance, and chemical inertness. Design reliability and the need for economical fabrication of complex shapes, however, have prevented ceramic materials from fulfilling their potential in these critical high temperature, high performance applications.

The design reliability problems with ceramics, and the resultant failure under stress, are due largely to the relatively brittle nature of ceramics. This, in combination with the high cost of fabricating complex shapes, has limited the usage of ceramics.

Ceramics made from organosilicon polymers have the potential to overcome these problems. To this end, polymers based on silicon, carbon and/or nitrogen and oxygen have been developed. See, e.g., "Siloxanes, Silanes and Silazanes in the Preparation of Ceramics and Glasses" by Wills, et al., and "Special Heat-Resisting Materials from Organometallic Polymers" by Yajima, in Ceramic Bulletin, Vol. 62, No. 8, pp. 893–915 (1983), and the references cited therein.

The major and most critical application for ceramics based on polymer processing is high strength, high modulus, shaped articles such as fibers. Such fibers are spun from organosilicon preceramic polymers, and then cured and pyrolyzed to their ceramic form. The low molecular weight and highly branched structure of typical preceramic polymers, however, alters the spinning and subsequent fiber handling behavior of these polymers from that of conventional polymers. In particular, gelation and foaming tendencies in the melted polymers used for melt spinning may lead to the presence of undesirable flaws in the resulting fiber. Such flaws are undesirable in fine diameter fibers since they are believed to be the source of cracking and lowered tensile strength. Furthermore, because of the low molecular weight of the preceramic polymers used, the fibers spun therefrom have relatively low tensile strength and are difficult to handle in spinning, curing, and subsequent pyrolysis operations.

One important step in the formation of shaped articles such as fibers involves curing the preceramic polymer prior to pyrolyzing the same. Although various curing techniques, such as oxidative/hydrolytic cures, are known in the art, nevertheless, a need exists for developing improved curing procedures which will render the fibers inert to morphological changes other than the desired densification as the filaments are pyrolyzed to ceramics.

Typical curing procedures of the prior art are described in U.S. Pat. Nos. 3,853,567, 4,535,007, and 4,399,232, wherein various curing agents are described.

The instant invention involves the use of gaseous thionyl chloride as a curing agent in order to obtain improved results including rapid curability, increased green strength (strength before pyrolysis) as well as increased strength of the shaped ceramic articles.

The expression "gaseous thionyl chloride" is intended to include thionyl chloride at temperatures sufficiently elevated to be in the gaseous state as well as saturated mixtures of thionyl chloride with an inert gas such as nitrogen or argon. In the latter case, the thionyl chloride can be below its boiling point.

Figure 1:
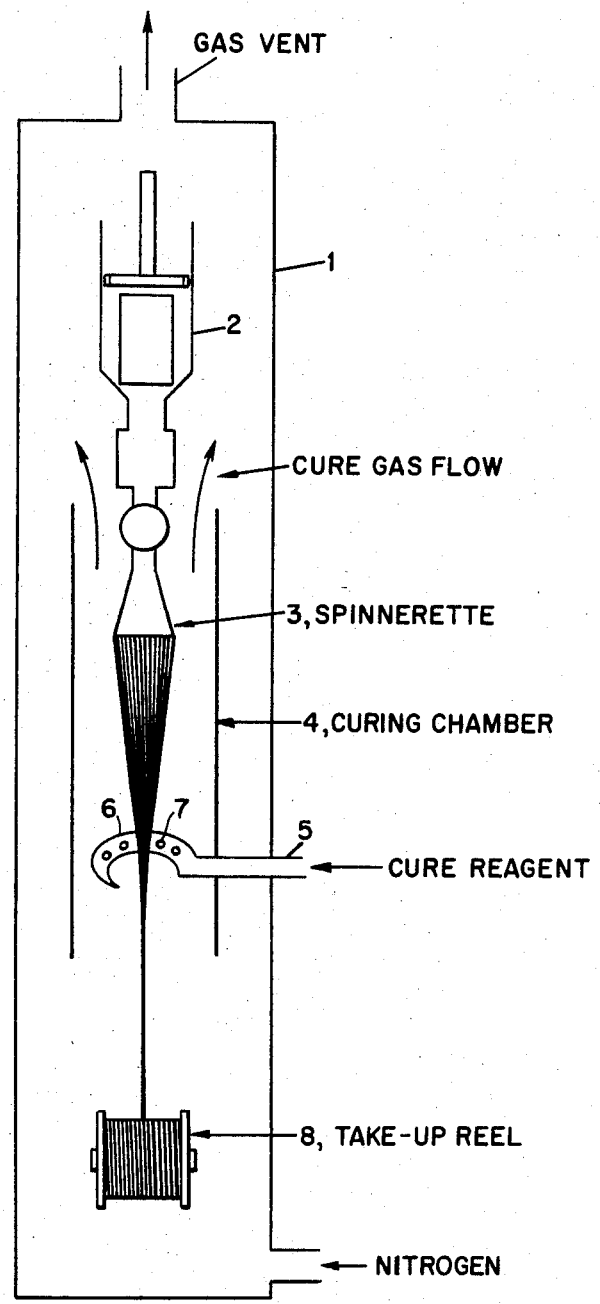
FIG. 1 represents a preferred method of carrying out the novel process of this invention.

In said FIG. 1, a preceramic polymer is melt spun using, for example, a ram type extruder. A polymer rod (2) is pressed onto a hot grid surface and the resulting molten polymer is forced through the spin pack and out the spinnerette (3). The fiber is drawn by controlling the take-up speed of the take-up reel (8) and the throughput of the polymer through spinnerette (3). The fiber is passed through a curing chamber (4) which contains the curing gas (5) which is introduced evenly around the fiber by means of a loop of tubing (6) with holes (7) facing toward the fiber. The entire system is protected from oxygen and moisture by means of an isolation chamber (1) flushed with an inert gas such as nitrogen.

SUMMARY OF THE INVENTION

Accordingly, a primary object of the present invention is to provide improved processes for the production of preceramic and ceramic fibers from organosilicon preceramic polymers involving the use of a novel curing agent.

Another object of the present invention is to provide improved melt spinning and dry spinning processes for the production of fine diameter, organosilicon preceramic fibers and ceramic fibers having high tensile strength, made therefrom.

Another object of the present invention is to provide improved processes for the production of preceramic and ceramic fibers based upon organosilicon preceramic polymers, which fibers have improved handleability, e.g., increased toughness and protection of the organosilicon preceramic material from abrasion and the atmosphere.

Still another object of the present invention is to provide improved processes for the production of improved preceramic fibers based upon organosilicon preceramic polymers, in which the organosilicon polymer material is protected from degradation by the oxygen and moisture in air.

These and other objects, aspects and advantages, as well as the scope, nature and utility of the present invention, will be apparent from the following description and appended claims.

DESCRIPTION OF THE PREFERRED EMBODIMENTS

The Organosilicon Preceramic Polymers

Organosilicon preceramic polymers are well known in the art. Such polymers contain silicon, carbon and/or nitrogen, and are fiber-forming, and can be cured and pyrolyzed to ceramic form. See, e.g., U.S. Pat. Nos. 4,310,651; 4,312,970; 4,342,712; 4,482,689; and 4,340,619; which are incorporated herein by reference.

These organosilicon precursor polymers may be made in a variety of ways as is known in the art. For example, they may be made by first dechlorinating an alkylchlorosilane, e.g., dimethyldichlorosilane, and polymerizing the product to form a polysilane, e.g., polydimethylsilane. This material is then heated to convert its backbone of silicon atoms to a backbone of alternating silicon and carbon atoms by forming a polycarbosilane.

Preferably, the organosilicon preceramic polymers utilized in the present invention consist essentially of silicon, carbon, nitrogen and oxygen. Such polymers are typically prepared by reacting a disilazane and a dichlorodisilane or methylchlorodisilane.

Most preferably, the organosilicon preceramic polymers of the present invention are characterized as polysilazanes prepared from methylchlorodisilanes and hexamethyldisilazane. Particularly preferred are the polysilazanes, containing N-Si-Si-N linkages. Optionally, the addition of difunctional monosilanes as co-reactants may be used to enhance spinning and/or subsequent fiber handling properties. Such difunctional monosilanes include preferably $R_1R_2SiCl_2$, where $R_1$ and $R_2$ may independently be a methyl, ethyl, phenyl or vinyl group.

Such organosilicon preceramic polymers may be further modified, for example, by incorporating vinyl functionality by reacting with the polymer itself. This may be achieved, for example, by co-reacting the polymer with a vinyl (Vi) halosilane such $ViR_1R_2SiCl$, where $R_1$ and $R_2$ may each independently be methyl or phenyl.

Another preferred type of organosilicon polymer which is thermally sensitive and which may be especially suitable in the present invention comprises a plurality of cyclic and/or linear precursor residues of the repeating units of formula I:

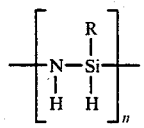

I linked together by $Si_2W_2$ bridges of formula II,

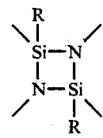

II wherein R is hydrogen, a lower alkyl group having from 1 to about 6 carbon atoms, a substituted or unsubstituted vinyl group, a substituted or unsubstituted alkyl group, a substituted or unsubstituted benzyl group, a substituted or unsubstituted lower aryl group having from 6 to about 10 carbon atoms, a tri(lower)alkyl or di(lower)alkylsilyl group, a di(lower)alkylamino group, a lower alkoxy group having from 1 to about 6 carbon atoms and n is an integer greater than one. The substituted groups are substituted with lower alkyl and lower aryl groups.

These polymers form novel ladder-like or planar array structures that are soluble in common organic solvents, stable at room temperature and thermally stable up to about 200° C. The ladder-like or planar array polymers of the present invention are formed in high yield by reaction of the cyclic and/or linear residues in the presence of a basic catalyst capable of deprotonating an NH function adjacent to silicon.

These polymers and their preparation are described more fully in U.S. Pat. No. 4,482,669, to Seyferth et al., assigned on its face to Massachusetts Institute of Technology, which patent is herein incorporated by reference.

Molecular weight ($M_n$) for the above organosilicon preceramic polymers may vary from about 500 to 20,000, typically about 700 to 5,000, and more typically 1,000 to 2,000 (g/mole-GPC method). These polymers may also have softening temperatures ($T_s$) of about 50° C. to 308° C., preferably about 60° C. to 200° C., and most preferably 70° C. to 150° C.

Spinning of the Fibers

As indicated earlier, the above-described organosilicon preceramic polymers are dry spun, melt spun or extruded as fibers or filaments.

To melt spin, the solid organosilicon polymer is melted at a temperature and rate sufficient to avoid gelation and foaming, and substantially immediately thereafter the melted polymer is preferably spun or extruded to form optically flaw-free, fine diameter organosilicon preceramic fiber.

Prior to spinning, any gel detected in the polymer blend should be removed such as by filtration. In addition, the polymer should be essentially free of other contaminants such as small insoluble particulates or bubbles.

The relatively short residence time of the polymer in the melt is critical to achieving optically flaw-free, fine diameter fibers. If an organosilicon polymer is brought up to a melt-processable or extrudable temperature and held at such temperatures for too long a period time, gelation will occur, which in turn will lead to the presence of noticeable flaws in the fiber and a concomitant loss of tensile properties. In addition, the melt temperature of the organosilicon polymer should be less than that needed to cause foaming of the polymer, which foaming will also lead to the presence of voids or flaws in the fiber. The typical organosilicon polymer is significantly more melt sensitive as compared to other conventional fiber-forming polymers, e.g., polyethylene terephthalate.

The actual melt temperatures may vary, but will generally be above the softening temperature ($T_s$) of the organosilicon polymer, but below that at which foaming, gelation or other degradation occurs within the total melt residence time. Typically, such melt temperature will range from about 30° C. to 130° C., and most preferably 60° C. to 80° C. above the $T_s$ of the polymer blend.

As the preceramic fibers are melt spun or extruded, fiber handling is preferably minimized to avoid abrasion of the fibers sufficient to cause fiber breakage during fiber take-up and/or sufficient to induce latent stressing sufficient to cause fiber breakage during subsequent curing and pyrolysis to ceramics. Thus, those type of conventional fiber take-up apparatus which induce high levels of stress in fiber are preferably not used. The preceramic fibers as spun are relatively brittle due to their relatively low molecular weight as compared to conventional fiber-forming polymers.

The preceramic fibers as spun may be taken up in any appropriate take-up speed. Take-up speed of up to about 1400 meters/minute, typically 100 to 1000, and preferably 300 to 800, may be used.

To dry spin, the solid organosilicon polymer is dissolved in a solvent at a relatively high polymer solids concentration, and thereafter the polymer is spun or extruded to form flaw-free organosilicon preceramic fiber.

Any solvent in which the organosilicon polymer may be dissolved at the relatively high solids concentration may be used. Suitable aliphatic hydrocarbon solvents may include those having from 1 to 8 carbon atoms and having boiling points ranging from about 0° C. to about 190° C. Typical aliphatic hydrocarbon solvents include n-hexane, cyclo-hexane, cyclo-hexene, n-pentane, cyclopentadiene, iso-octane, acetonitrile, dichloroethane, trichloroethane, hexachloroethane, chloroform, methylchloroform, methylene chloride, methyl acetate, ethyl acetate, carbon tetrachloride, and tetrahydrofuran. Suitable aromatic hydrocarbon solvents may include those having from 6 to 10 carbon atoms and have boiling points ranging from about 70° C. to 180° C. Typical aromatic hydrocarbon solvents include toluene, xylene, styrene, benzene, chlorobenzene, dichlorobenzene, ethylbenzene, and isopropylbenzene. Toluene and xylene are particularly preferred.

Prior to spinning, any gel detected in the polymer should be removed such as by filtration. In addition, the polymer should be essentially free of other contaminants such as small insoluble particulates.

As indicated above, the relatively high solids concentration of the polymer in the spinning solution is critical to achieving a self-supporting threadline with these low-molecular weight polymers. If insufficiently high and organosilicon polymer solids concentrations are used, threadline breakdown will frequently occur. Preferably, polymer solids concentrations of at least about 70 percent, and most preferably at least about eighty percent are used.

After dissolution and prior to spinning, the polymer should be maintained in solution in an essentially gel-free state, i.e., kept under conditions insufficient to cause gel formation of polymer in the solvent.

The actual solution temperatures at spinning may vary, but will generally be near the boiling point of the solvent (to improve solvent evaporation) but below that at which foaming, gelation or other degradation occurs within the total dry spinning residence time. Typically, at spinning such solution temperatures will be between about 70° C. and 250° C., preferably 70° C. to 200° C. and most preferably 90° C. to 160° C.

As the preceramic fibers are dry spun and solvent-extracted, fiber handling is preferably minimized to avoid abrasion of the fibers sufficient to cause fiber breakage during fiber take-up and/or sufficient to induce latent stressing sufficient to cause fiber breakage during subsequent curing and pyrolysis. Thus, those types of conventional fiber take-up apparatus which induce high levels of stress in fiber are preferably not used. The preceramic fibers during and after spinning and solvent extraction are relatively brittle due to their relatively low molecular weight as compared to conventional fiber-forming polymers.

Curing of the Spun Fibers

The novel process of this invention involves curing the preceramic fibers as spun by contacting the same with gaseous thionyl chloride which is preferably admixed with an inert gas such as nitrogen and argon, etc. The curing of the preceramic polymer can take place during either of two stages. It can be cured in a batch manner after it has been formed into a desired shape, e.g. fibers can be made and cured after they have been placed on a take-up reel. The most preferred method of cure, however, is to treat the fiber immediately after it is spun or before it is placed on the conventional take-up reel. The preferred curing technique can be conveniently carried out using the procedure shown in FIG. 1.

The amount of thionyl chloride utilized is not narrowly critical and it can be introduced at any suitable concentration ranging from 100% to a 0.005 mol percent mixture of the same with an inert gas. The residence time is also quite flexible and can range from 0.0001 to 30 minutes depending on such factors as the concentration of the thionyl chloride, the thickness of the shaped polymeric article, etc.

The temperature employed for curing can range from room temperature up to the glass transition temperature of the particular polymer. It is preferred to operate at temperature at least 20° C. below said glass transition temperature.

Following the above-described curing, the preceramic polymers are subject to pyrolysis conditions which render the fibers ceramic. Typically pyrolysis conducted in inert atmosphere of nitrogen argon or the like, pyrolysis temperatures may be from about 600° to 1800° C., preferably 850° to 1400° C. and most preferably 1100° to 1400° C.

EXAMPLE 1

An organosilicon preceramic polymer is prepared according to the general procedure of U.S. Pat. No. 4,535,007 and is introduced into a melt extruder after filtration. The polymer is passed through a spinneret at a temperature of 180° C. to produce fibers which are collected on a take-up reel.

Lengths of fiber were removed from said take-up reel and placed in a ceramic container which was then placed into a curing chamber whose environment and temperature could be controlled.

Gaseous thionyl chloride (0.08 mole %) in admixture with argon was introduced into the curing chamber at about 150 cc/min. for about 5 minutes while the temperature was maintained at about 40° C.

The fibers were then subjected to the following heat treatment cycle in an argon atmosphere.

| Temperature | Time |
|---|---|
| 40° C. | 1 hr. |
| 40–300° C. | 1 hr. |
| 300° C. | 0.5 hr. |
| Cool to room temperature (RT) | |
| RT–500° C. | 1 hr. |
| 500–1200° C. | 2 hrs. |
| Cool to RT | |

The above procedure resulted in the production of ceramic fibers having the physical properties shown in the following Table.

TABLE

| Example | Tensile Strength Ksi[1] | Elastic Modulus Msi[2] | Fiber Diameter (Micrometers) |
| --- | --- | --- | --- |
| 1 | 115 | 18.5 | 12 |

[1] 1,000 lbs/sq. in.

[2] 1,000,000 lbs/sq. in.

EXAMPLE 2

This example will illustrate the improved green strength of the polymer cured in accordance with the teachings of this invention.

The procedure of Example 1 was repeated except that the heat treatment was simply at 300° C. and no pyrolysis to ceramic was carried out.

The improved physical properties are shown below and compared with a prior art trichlorosilane cure.

| CURE AGENT | MODULUS g/denier | BREAKWORK × 10(−3) g-in/denier | ELONG % | SHRINK ON CURE % |
| --- | --- | --- | --- | --- |
| Thionyl chloride | 23.7 | 7.88 | 2.5 | 10.0 |
| Trichlorosilane | 23.4 | 2.83 | 1.4 | 8.5 |

What is claimed is:

1. A process for producing a ceramic material which comprises:
   (a) contacting a shaped article made from an organosilicon preceramic polymer with a gaseous thionyl chloride for a period of time sufficient to cure the same; and
   (b) thereafter pyrolyzing said shaped preceramic article by heating the same in an inert atmosphere at elevated temperatures.

2. The process of claim 1 wherein said shaped article is a fiber.

3. The process of claim 2 wherein said contacting said thionyl chloride is done immediately after the fiber is spun.

4. The process of claim 3 wherein said thionyl chloride is admixed with an inert gas.

* * * * *